J. RUZICKA & D. L. GRANTHAM.
AIR VALVE ATTACHMENT.
APPLICATION FILED NOV. 10, 1916.

1,236,111.  Patented Aug. 7, 1917.

WITNESSES
Edw. Thorpe.

INVENTORS
Jerome Ruzicka
David L. Grantham
BY
ATTORNEYS.

UNITED STATES PATENT OFFICE.

JEROME RUZICKA AND DAVID L. GRANTHAM, OF LANKIN, NORTH DAKOTA.

AIR-VALVE ATTACHMENT.

1,236,111.

Specification of Letters Patent.   Patented Aug. 7, 1917.

Application filed November 10, 1916.   Serial No. 130,550.

*To all whom it may concern:*

Be it known that we, JEROME RUZICKA and DAVID L. GRANTHAM, both citizens of the United States, and residents of Lankin, in the county of Walsh and State of North Dakota, have invented a new and Improved Air-Valve Attachment, of which the following is a full, clear, and exact description.

Our invention relates to a dust cap adapted to be applied to an air valve, and is more particularly intended for use on the air valves of pneumatic tires.

The prime object of the invention is to provide a dust cap and a co-acting element so formed and arranged that the dust cap may be quickly engaged with the threads of the air valve or disengaged therefrom, thereby avoiding the necessity of screwing the cap any material distance on the valve in applying and removing the cap. The stated object is attained by a cap having a threaded interior and made resilient at the threaded portion to expand and contract, there being a nut applicable to the threaded stem of the valve and formed with a flaring surface to receive the resilient end of the cap, so that the cap may be slipped onto the valve stem to contact with the nut and then given one or two turns to cause the resilient threaded portion of the cap to firmly bind on the threads of the stem.

The invention will be particularly explained in the specific description following.

Reference is to be had to the accompanying drawings forming a part of this specification in which similar reference characters indicate corresponding parts in all the views.

Figure 1:
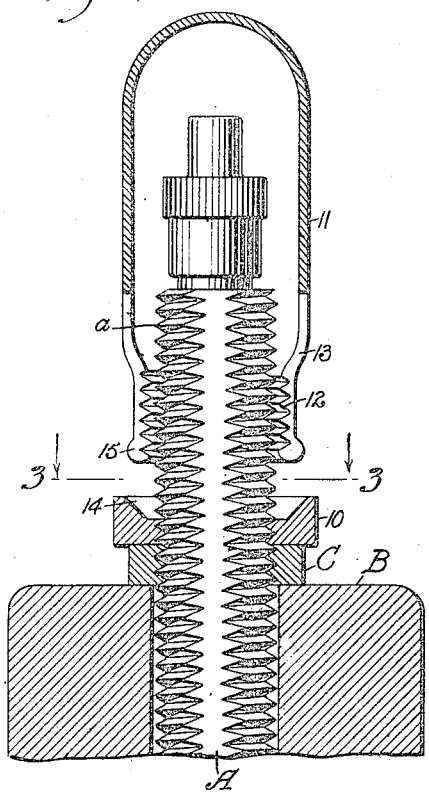
Figure 1 is a longitudinal section of our improved valve cap and the securing means therefor, showing the cap applied to the valve stem but in the unfastened position.

In the illustration, the letter A indicates the stem of a known form of valve having threads $a$; B represents a portion of a wheel felly. The element indicated by the letter C may represent a washer or locknut.

In carrying out our invention, a nut 10 is provided adapted to engage the threads $a$ of the stem A. The cap 11 is generally of dome-shape. At the forward open end of the cap 11, the same is formed with internal threads 12 corresponding with the threads $a$ of the valve stem, and said cap is formed with longitudinal slots 13 extending across the threads 12 so that the forward end of the cap is made resilient.

The face of the nut 10 is formed with a depression 14 having a beveled outer wall against which the forward edge 15 of the cap is adapted to come to a bearing, said edge being preferably in the form of a bead. The cap 11 is adapted to be slipped over the end of the valve stem A with a sliding movement until the forward edge 15 contacts with the flaring wall of the nut 10 which deflects the resilient members of the cap inwardly, thereby bringing the threads 12 of the cap into engagement with the threads $a$ of the valve stem, whereupon a turn or two of the cap will cause the threaded portion thereof to bind tightly on the valve stem by reason of the beveled surface of the depression 14. Similarly, to remove the cap a turn or two is necessary only to allow clearance for the resilient forward end of the cap to expand and become disengaged from the threads of the stem, whereupon the cap can be quickly withdrawn by a sliding movement relatively to the stem.

Figure 2:
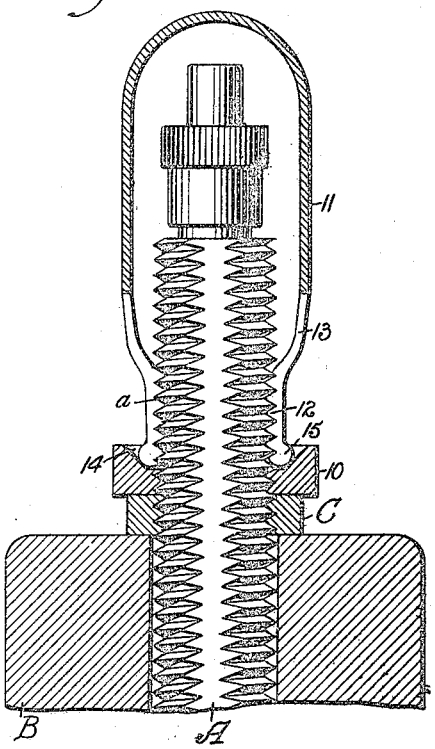
Fig. 2 is a view similar to Fig. 1 but showing the cap firmly engaging the valve stem.
Figure 3:
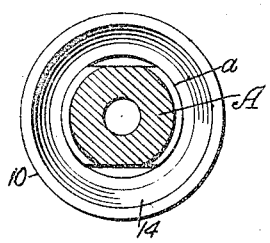
Fig. 3 is a cross section on the line 3—3, Fig. 1.
Figure 5:
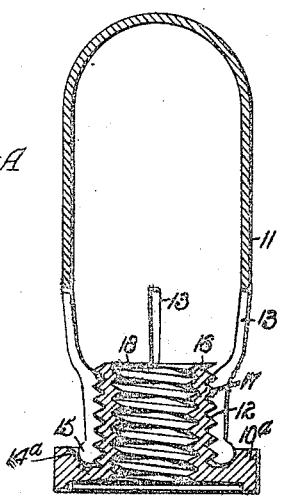
Fig. 5 is a longitudinal section of the valve cap and a modified form of the securing means.
Figure 4:
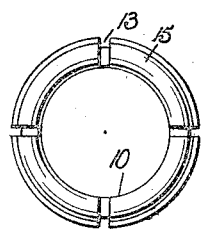
Fig. 4 is a bottom plan view of the valve cap.

In the form shown in Figs. 1 and 2, the nut 10 has a threaded bore corresponding with a valve stem of large diameter. In order to adapt the attachment to a small valve stem without varying the size of the cap 11, a nut 10ᵃ is provided as in Fig. 5, said nut having a boss 16 formed with external threads 17 to engage the threads 12 of the cap and formed with internal threads 18 to engage the threads of the valve stem. The nut 10ᵃ has a flaring depression 14ᵃ and the cap 11 has the described slots 13 so that when the nut 10ᵃ is applied to a small valve stem, the manner of securing and detaching the cap will be the same as above described.

The resiliency of the cap maintains the threaded open end thereof expanded and the flaring face of the nut constricts the resilient portion of the cap to an extent approximately equaling the depth of the threads of the cap, so that in the expanded form the cap can be slipped onto the valve until the flaring face of the nut is engaged, whereupon the resilient portion will be constricted approximately to the depth of the threads to first effect threaded engagement with the stem.

It will be observed that the threaded resilient front portion of the cap is deflected inwardly to a diameter less than that of the upper closed portion of the cap, whereby to provide a considerable threaded area which will always be approximately parallel with the threaded valve stem while the closed portion of the cap has ample clearance and accommodation for the outer end of the valve stem.

Having thus described our invention we claim as new and desire to secure by Letters Patent:

1. A cap for air valves formed with internal threads at the open end thereof and longitudinally slotted at the said open end, and compressing means for said cap securable to a valve stem to engage the forward edge of the cap and compress the slotted portion to constrict its threaded portion.

2. A cap for air valves, the same being longitudinally slotted at the open end and internally threaded at the said slotted end, and a nut adapted to be secured on the stem, said nut having a flaring surface to engage the forward edge of the cap and constrict the said slotted and threaded end of the cap.

3. A cap for air valves, having an internally threaded open end, in combination with a nut having a boss and internally threaded to engage a valve stem, the boss being externally threaded to correspond with the threads of the cap, the said threaded portion of the cap being resilient and normally expanded to a diameter to slidably receive the boss, the said nut outside of the boss having a flaring face adapted to engage the front end of the cap and constrict the same to a diameter to engage and bind upon the threaded exterior of the boss.

4. A cap for air valves, longitudinally slotted at the open end and internally threaded at said open end, the threaded portion being constricted to present a less diameter than the unthreaded portion, and a nut adapted to engage a valve stem, said nut having a depressed outer face presenting a flaring surface to engage the forward edge of the cap.

JEROME RUZICKA.
DAVID L. GRANTHAM.